United States Patent
Jin et al.

(10) Patent No.: US 9,286,074 B2
(45) Date of Patent: Mar. 15, 2016

(54) NOP INSTRUCTION COMPRESSING APPARATUS AND METHOD IN A VLIW MACHINE

(75) Inventors: Tai-Song Jin, Seoul (KR); Dong-Hoon Yoo, Seoul (KR); Bernhard Egger, Seoul (KR); Won-Sub Kim, Anyang-si (KR); Jin-Seok Lee, Seoul (KR); Sun-Hwa Kim, Seoul (KR); Hee-Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 12/912,533

(22) Filed: Oct. 26, 2010

(65) Prior Publication Data

US 2011/0202749 A1 Aug. 18, 2011

(30) Foreign Application Priority Data

Feb. 18, 2010 (KR) .................. 10-2010-0014851

(51) Int. Cl.
*G06F 9/318* (2006.01)
*G06F 9/38* (2006.01)
*G06F 9/30* (2006.01)

(52) U.S. Cl.
CPC ............ *G06F 9/3822* (2013.01); *G06F 9/3017* (2013.01); *G06F 9/30076* (2013.01); *G06F 9/3853* (2013.01)

(58) Field of Classification Search
CPC ..................... G06F 9/30076; G06F 9/3853
USPC ......................................................... 712/24
See application file for complete search history.

(56) References Cited

U.S. PATENT DOCUMENTS 5,958,044 A    9/1999  Brown et al.
6,044,450 A *  3/2000  Tsushima et al. .............. 712/24

(Continued)

FOREIGN PATENT DOCUMENTS

KR    10-2008-0086739    9/2008

OTHER PUBLICATIONS

Aslam et al, Code Compression and Decompression for Instruction cell based reconfigurable systems, Mar. 2007, Parallel and Distributed Processing Symposium IEEE International, IPDPS 2007, 1-7.*

(Continued)

*Primary Examiner* — Andrew Caldwell
*Assistant Examiner* — Jyoti Mehta
(74) *Attorney, Agent, or Firm* — NSIP Law (57) ABSTRACT

An instruction compressing apparatus and method for a parallel processing computer such as a very long instruction word (VLIW) computer, are provided. The instruction compressing apparatus includes a bundle code generating unit, an instruction compressing unit, and an instruction converting unit. The bundle code generating unit may generate a bundle code in response to an input of instructions to be compressed. The bundle code may indicate whether a current instruction group is terminated, and also whether an instruction group following the current instruction group is a no-operation (NOP) instruction group. The instruction compressing unit may remove a NOP instruction and/or a NOP instruction group from the input instructions according to the generated bundle code. The instruction converting unit may include the generated bundle code in the remaining instructions which have not been removed by the instruction compressing unit.

1 Claim, 5 Drawing Sheets

(56) References Cited

U.S. PATENT DOCUMENTS

| | | | |
|---|---|---|---|
| 6,275,921 B1* | 8/2001 | Iwata et al. | 712/24 |
| 6,799,266 B1 | 9/2004 | Stotzer et al. | |
| 7,124,279 B2 | 10/2006 | Topham | |
| 2004/0019762 A1* | 1/2004 | Fukuoka et al. | 711/203 |
| 2005/0050300 A1* | 3/2005 | May et al. | 712/24 |
| 2005/0125633 A1* | 6/2005 | Topham | 712/210 |
| 2005/0268075 A1* | 12/2005 | Caprioli et al. | 712/239 |
| 2006/0168424 A1* | 7/2006 | Leijten et al. | 712/24 |
| 2008/0235492 A1* | 9/2008 | Baek et al. | 712/24 |
| 2010/0088536 A1* | 4/2010 | Lee et al. | 713/502 |

OTHER PUBLICATIONS

Xie et al, A code decompression architecture for VLIW processors, Dec. 2001, Microarchitecture 2001 Micro-34, pp. 66-75.*

VLIW Processors, 2006, 13 pages, [retrieved from the internet on Jun. 14, 2015], retrieved from URL <http://courses.cs.washington.edu/courses/csep548/06au/lectures/vLIW.pdf>.*

* cited by examiner

| A | nop | nop | nop | B | nop | nop | nop | nop | nop | nop |
|---|-----|-----|-----|---|-----|-----|-----|-----|-----|-----|
| C | nop | nop | D | E | nop | F | G | H | I | nop | nop |
| J | K | nop | nop | nop | nop | | | | | |

| A | nop | nop | ~301 |
|---|-----|-----|------|
| nop | B | nop | ~302 |
| nop | nop | nop | ~303 |
| nop | nop | nop | ~304 |
| C | nop | nop | ~305 |
| D | E | nop | ~306 |
| F | G | H | ~307 |
| I | nop | nop | ~308 |
| J | K | nop | ~309 |
| nop | nop | nop | ~310 |

FIG. 3C

| A | 0 | 1 | | | | | | ~ 301' |
| nop | 0 | 0 | B | 1 | 1 | | | ~ 302' |
| | | | | | | | | ~ 303' |
| | | | | | | | | ~ 304' |
| C | 0 | 1 | | | | | | ~ 305' |
| D | 0 | 0 | E | 0 | 1 | | | ~ 306' |
| F | 0 | 0 | G | 0 | 0 | H | 0 | 1 | ~ 307' |
| I | 0 | 1 | | | | | | ~ 308' |
| J | 0 | 0 | K | 1 | 0 | | | ~ 309' |
| | | | | | | | | ~ 310' |

NOP INSTRUCTION COMPRESSING APPARATUS AND METHOD IN A VLIW MACHINE

CROSS REFERENCE TO RELATED APPLICATION(S)

This application claims the benefit under 35 U.S.C. §119(a) of Korean Patent Application No. 10-2010-0014851, filed on Feb. 18, 2010, the entire disclosure of which is incorporated herein by reference for all purposes.

BACKGROUND

1. Field

The following description relates to an instruction set architecture (ISA) for a computer architecture, and more particularly, to instruction compression for an instruction-level parallelism architecture such as a very long instruction word (VLIW) computer architecture.

2. Description of the Related Art

A very long instruction word (VLIW) computer architecture refers to a central processing unit (CPU) architecture designed for processing instructions according to an instruction-level parallelism (ILP). A VLIW computer includes a plurality of functional units (FUs) for executing multiple instructions simultaneously. Instructions input to the VLIW computer may be divided into instruction groups such that the number of instructions corresponds to the number of FUs. The term instruction group is also referred to as an instruction bundle in which the instructions are executed by the multiple FUs concurrently. Because instructions belonging to one instruction bundle may be allocated to the respective FUs and processed concurrently, the VLIW computer can reduce time for processing the total number of instructions.

The maximum number of instructions that may be processed simultaneously by an ILP computer such as a VLIW computer is theoretically the same as the number of FUs. However, due to the dependency between the instructions, the number of instructions that may be executed simultaneously may be smaller than the number of the FUs. For example, a situation frequently occurs where some or all of the FUs cannot process a certain instruction because an operation result according to a previous instruction is needed to execute the certain instruction and is not yet obtained. Accordingly, the VLIW computer allocates a no-operation (NOP) instruction to a FU such that the FU does not process instructions at that time.

Because of the additional NOP instructions, the total number of instructions in the VLIW computer is increased, thereby causing performance degradation. Because the total number of instructions is increased, a memory of a large capacity is usually required. In addition, the probability of cache miss occurring due to the large capacity of the memory is increased, which may lead to reduction of the overall system speed. Furthermore, the large number of instructions may also incur instruction fetch overhead.

To prevent the performance degradation of the VLIW computer, various studies on instruction compression for compressing and storing instructions have been performed. For example, the instruction compression methods may involve a stop-bit or a parallel-bit (p-bit) that is allocated to an instruction to inform of the stopping of a valid instruction in an instruction group or a to a group header that is assigned to the instruction group that is used to indicate the size of a group and a location of a NOP instruction. Also, a method has been suggested to compress instructions by inserting an index code that indicates the number of subsequent NOP instructions. The index code may be inserted into a valid instruction in the same instruction group or into each valid instruction for indicating the order of executing valid instructions in the same instruction group.

SUMMARY

In one general aspect, there is provided an apparatus for compressing instructions to be executed by a parallel processing computer, the apparatus including: a bundle code generating unit configured to: generate a bundle code based on input instructions, indicate whether a current instruction group is terminated, and indicate whether a subsequent instruction group is a no-operation (NOP) instruction group, an instruction compressing unit configured to remove a NOP instruction and/or a NOP instruction group from the input instructions according to the bundle code generated by the bundle code generating unit, and an instruction converting unit configured to include the generated bundle code in the remaining instructions which are not removed by the instruction compressing unit.

The apparatus may further include that a maximum number of instruction groups that can be removed by the instruction compressing unit is restricted by a length of the bundle code.

The apparatus may further include that the bundle code includes one of: a first code to indicate that the current instruction group is not terminated, a second code to indicate that the current instruction group is terminated and the next instruction group following the current instruction group is not a NOP instruction group, and a third code to indicate that the current instruction group is terminated and the next instruction group following the current instruction group is a NOP instruction group.

The apparatus may further include that, in response to the bundle code generating unit generating the first code, the instruction compressing unit is further configured to not remove any NOP instructions.

The apparatus may further include that, in response to the bundle code generating unit generating the second code, the instruction compressing unit is further configured to remove all subsequent NOP instructions from the current instruction groups.

The apparatus may further include that in response to the bundle code generating unit generating the third code, the instruction compressing unit is further configured to remove any subsequent NOP instructions from the current instruction group and the next NOP instruction group following the current instruction group.

The apparatus may further include that: the bundle code is represented by two or more bits, and the bundle code further includes a fourth code to indicate that: the current instruction group is terminated, and the next two instruction groups following the current instruction group are NOP instruction groups.

The apparatus may further include that, in response to the bundle code generating unit generating the fourth code, the instruction compressing unit is further configured to remove all subsequent NOP instructions from the current instruction group and each of the next two NOP instruction groups following the current instruction group.

The apparatus may further include that a size of the instruction group corresponds to a maximum number of instruction groups that can be processed simultaneously by the parallel is processing computer.

The apparatus may further include that the instruction converting unit is further configured to substitute some bits of the instruction with the bundle code.

In another general aspect, there is provided a method of compressing instructions to be executed by a parallel processing computer, the method including: receiving instructions, generating a bundle code to indicate: whether a current instruction group is terminated, and whether a following instruction group is a no-operation (NOP) instruction group, removing a NOP instruction and/or a NOP instruction group from the received instructions according to the generated bundle code, and including the generated bundle code in each of the remaining instructions which have not been removed.

The method may further include that a maximum number of NOP instruction groups that can be removed is restricted by a length of the bundle code.

The method may further include that the bundle code includes one of: a first code to indicate that the current instruction group is not terminated, a second code to indicate that the current instruction group is terminated and the next instruction group following the current instruction group is not a NOP instruction group, and a third code to indicate that the current instruction group is terminated and the next instruction group following the current instruction group is a NOP instruction group.

The method may further include that: in response to the generating of the bundle code generating the first code, no NOP instructions are removed, in response to the generating of the bundle code generating the second code, all subsequent NOP instructions are removed from the current instruction group, and in response to the generating of the bundle code generating the third code, any subsequent NOP instructions are removed from the current instruction group and the next NOP instruction group following the current instruction group is removed.

The method may further include that: the bundle code is represented by two or more bits, and the bundle code further includes a fourth code to indicate that the current instruction group is terminated and the next two instruction groups following the current instruction group are NOP instruction groups.

The method may further include that, in response to the generating of the bundle code generating the fourth code, all subsequent NOP instructions are removed from the current instruction group and the next two NOP instruction groups following the current instruction group are removed.

The method may further include that a size of the instruction group corresponds to a maximum number of instruction groups that can be processed simultaneously by the parallel processing computer.

In another general aspect, there is provided a method of compressing instructions to be executed by a parallel processing computer, the method including: receiving instructions, generating a bundle code to indicate whether an instruction group following a current instruction group is a no-operation (NOP) instruction group, removing a NOP instruction group from the received instructions according to the generated bundle code, and including the generated bundle code in the remaining instructions which have not been removed.

The method may further include that the bundle code further indicates: whether the current instruction group is terminated, and whether the instruction group following the current instruction group is a NOP instruction group.

The method may further include that: the bundle code is represented by two bits, and the bundle code includes one of: a first code to indicate that the current instruction group is not terminated, a second code to indicate that the current instruction group is terminated and the next instruction group following the current instruction group is not a NOP instruction group, a third code to indicate that the current instruction group is terminated and the next one instruction group following the current instruction group is a NOP instruction group, and a fourth code to indicate that the current instruction group is terminated and the next two instruction groups following the current instruction group are NOP instruction groups.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and structures may be omitted for increased clarity and conciseness.

Figure 1:
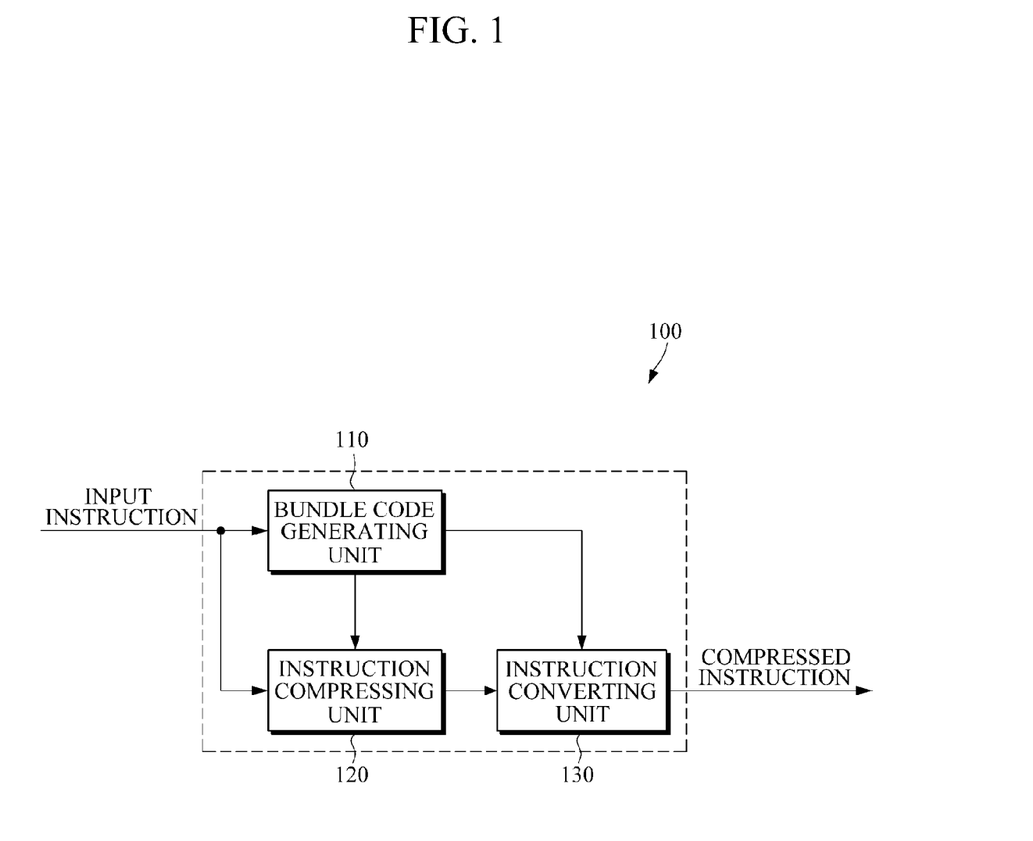
FIG. 1 is a diagram illustrating an example of an instruction compressing apparatus.

FIG. 1 illustrates an example of an instruction compressing apparatus. Instruction compressing apparatus 100 may be included in an instruction level parallelism computer.

Referring to FIG. 1, an instruction compressing apparatus 100 includes a bundle code generating unit 110, an instruction compressing unit 120, and an instruction converting unit 130. In the example illustrated in FIG. 1, the units 110, 120, and 130 are independent from one another according to their functionality. However, it should be appreciated that two or more units may be integrated together to form a single component. That is, the division of the units 110, 120, and 130 in this example is for convenience of explanation, and some or all of the functions of one unit may be performed by other units.

The bundle code generating unit 110 generates one or more bundle codes for the respective instruction groups, for example, the respective instructions which are not removed but remain in the instruction compressing unit 120. A bundle code indicates information about a NOP instruction of a current instruction group and/or one or more following instruction groups. For example, the bundle code may indicate whether the current instruction group or the current bundle is terminated at a current instruction included in the bundle code. In addition, where the current bundle is terminated at the current instruction, the bundle code may indicate whether the instructions in one or more following instruction groups are NOP instructions or not. Hereinafter, the instruction group including only NOP instructions is an "NOP bundle." The bundle code may be represented by one or more bits, for example, one bit, two bits, three bits, four bits, or more.

A "valid instruction" refers to an instruction that directs a functional unit (FU) to execute is a corresponding operation in response to an input of the instruction. There is no limit to the type and/or complexity of the operation and the dependency between adjacent operations. Alternatively, an "NOP" instruction refers to an instruction that directs an FU not to execute any operation at the time of the input of the instruction.

A bundle code may indicate that a current bundle is terminated. This refers to an example where a current instruction group does not have any valid instructions following an instruction including the bundle code. That is, in this example all instructions in the current instruction group subsequent to the instruction including the bundle code are NOP instructions. The instruction including the bundle code is generally a valid instruction but can be a NOP instruction in some examples. On the other hand, if the bundle code indicates that a current bundle is not terminated, this refers to a situation where one or more valid instructions exist in the current instruction group subsequent to an instruction including the bundle code itself. Therefore, if a NOP instruction follows a current instruction and another valid instruction exists subsequent to the NOP instruction, the current bundle is not terminated.

The bundle code may be composed of compression bits that indicate all instructions belonging to a following instruction group are NOP instructions. A bundle code may not indicate the number of instructions following a NOP instruction, but whether the following instruction group is a NOP bundle or not. For example, a bundle code may indicate whether a subsequent instruction group is a NOP bundle, and if so, whether only one following instruction group is a NOP bundle or two or more following instruction groups are NOP bundles. Accordingly, the bundle code may be efficient in compressing instructions in which one or more NOP bundles are included.

The bundle code is different from a code that indicates the number of subsequent NOP instructions or a code that indicates the number of NOP instructions interposed between valid instructions. When a code is used to indicate the number of NOP instructions, a larger number of bits may be used as a code when many NOP instructions are present. In some embodiments, if the length of a code is limited and numerous NOP instructions are present consecutively in the NOP bundle, the code may not indicate the number of NOP instructions. Accordingly, the code that indicates the number of NOP instructions may have limited compression efficiency with respect to instructions in which one or more NOP bundles are included.

When using a code to indicate whether a current bundle is terminated or not, a 1-bit code may be used. However, the bundle code may also indicate whether one or more instruction groups following the current bundle are NOP bundles. Thus, the bundle code may include one or more additional bits. Accordingly, the bundle code may be formed of at least two bits. As shown in Table 1, if a bundle code is formed of 2 compression bits, the bundle code may indicate whether two consecutive instruction groups subsequent to a current bundle are NOP bundles. Alternatively, if three or more bits are used for a bundle bit, the bundle code may indicate whether subsequent three or more consecutive instruction groups are NOP bundles.

Table 1 illustrates examples of information indicated by each bundle code when two bits are used for the bundle code. For example, referring to Table 1, a bundle code "00" may indicate that a current bundle is not terminated, and the other bundle codes "01", "10", and "11" may indicate that the current bundle is terminated. In this example, the bundle code "01" indicates that the current bundle is terminated and the next instruction group is not a NOP bundle (in other words, the next bundle is not empty). The bundle code "10" indicates that the current bundle is terminated and the following instruction group is a NOP bundle (that is, the next bundle is empty). The bundle code "11" indicates that the current bundle is terminated and the following two instruction groups are NOP bundles (the next two bundles are empty).

TABLE 1

| Bundle Code | Description |
| --- | --- |
| 00 | Current bundle not terminated |
| 01 | Current bundle terminated & Next bundle is not NOP bundle |
| 10 | Current bundle terminated & Next bundle is NOP bundle |
| 11 | Current bundle terminated & Next two bundles are NOP bundles |

The instruction compressing unit 120 removes a NOP instruction from input instructions to correspond to the bundle code generated by the bundle code generating unit 110. For example, information of the bundle code generated by the bundle code generating unit 110 may be transmitted to the instruction compressing unit 120. The operations of the bundle code generating unit 110 and the instruction compressing unit 120 may be performed concurrently. The operation of the instruction compressing unit 120 is further described with reference to the bundle codes shown in Table 1.

If the bundle code generating unit 110 generates the bundle code "00", in response the instruction compressing unit 120 does not remove a subsequent NOP instruction from the current instruction group. This is because other valid instructions are present following the NOP instruction in the current instruction group. When the bundle code generating unit 110 generates the bundle code "01", the instruction compressing unit 120 removes the following NOP instruction from the current bundle. When the bundle code generating unit 120 generates the bundle code "10", the instruction compressing unit 120 removes the following NOP instruction from the current bundle and one instruction group, which is a NOP bundle, subsequent to the current bundle.

In addition, when the bundle code generating unit 110 generates the bundle code "11", the instruction compressing unit 120 removes the following NOP instruction from the current instruction group and two subsequent instruction groups which are all NOP bundles. If three or more NOP bundles follow the current bundle, the first NOP instruction in the third NOP bundle is not removed. In this example, a bundle code may be added to the undeleted first NOP instruction, removing the other NOP instructions from the third NOP bundle and also the other NOP bundles following the third NOP bundle. Additionally, it should be understood that if the bundle code generating unit 110 generates a bundle code of three or more bits, the instruction compressing unit 120 may remove three or more consecutive NOP bundles.

The instruction converting unit 130 adds the bundle code generated by the bundle code generating unit 110 to each of remaining instructions that are not removed by the instruction compressing unit 120. Each of the remaining instructions may be a valid instruction or a NOP instruction. The bundle code may be added to the end of each remaining instruction, or added in various other ways. There is no limitation on methods to add a bundle code to an instruction. For example, a bundle code may be added to a remaining instruction, or replaced with a bit at the end of the instruction. Accordingly, the instruction converting unit 130 may output a compression instruction including the bundle code.

Figure 2:
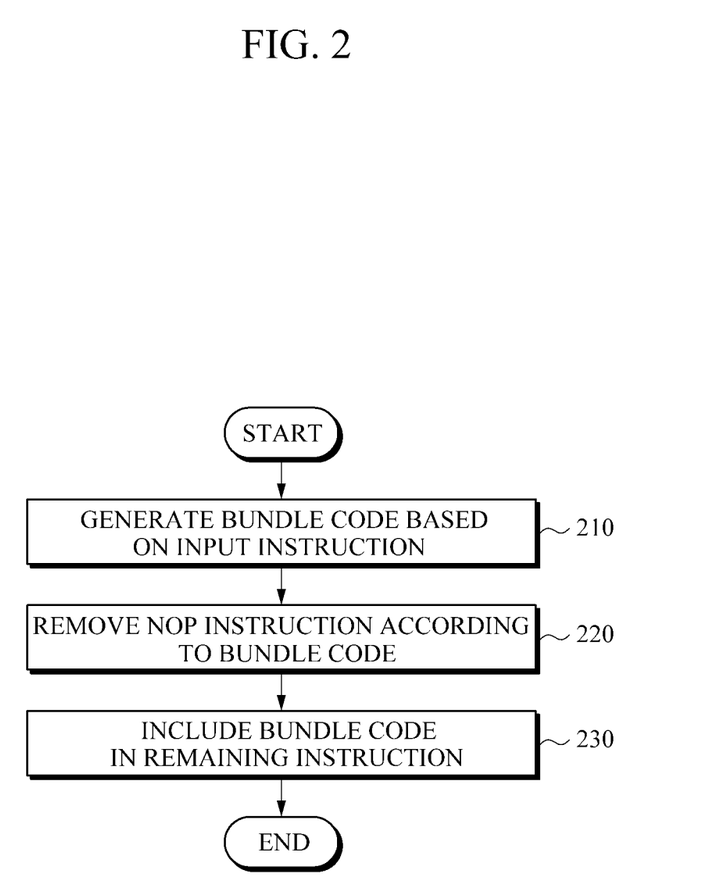
FIG. 2 is a flowchart illustrating an example of a method of compressing instructions.

FIG. 2 illustrates an example of a method of compressing instructions.

Referring to FIG. 2, operations, such as operation 210 and operation 220, shown in the flowchart illustrated in FIG. 2 are not necessarily performed according to the temporal order. Accordingly, it should be understood that the order of performing operations 210 and 220 may be changed or the operations may be performed simultaneously. The method shown in the example illustrated in FIG. 2 may be implemented by the instruction compressing apparatus 100 illustrated in FIG. 1. For conciseness, the procedures for instruction compression are described briefly.

Referring to FIG. 2, in response to inputting instructions, in operation 210 a bundle code is generated with respect to a valid instruction and one or more NOP instructions. The bundle code indicates whether a current instruction group or a current bundle is terminated or not, and if is the current bundle is terminated, the bundle code also indicates whether the instructions belonging to one or more following instruction groups subsequent to the current bundle are NOP instructions. Hereinafter, the instruction groups that have only NOP instructions are referred to as a "NOP bundle." The bundle code may be generated not only for a valid instruction, but also for a NOP instruction when the NOP instruction precedes the valid instruction or the number of NOP bundles exceeds the maximum number of NOP bundles that can be represented by the bundle code (referring to the bundle code "00" shown in Table 1).

In operation 220, instruction compression is performed to remove some NOP instructions from the input instructions. For example, NOP instructions for which the bundle code is not generated in operation 210 may be removed. Each of the removed NOP instructions may be a NOP instruction subsequent to a valid instruction (or a NOP instruction) in the current instruction group. If another valid instruction follows the NOP instruction, the NOP instruction may not be removed. Alternatively, the removed NOP instructions may be all NOP instructions in a NOP bundle.

In operation 230, the bundle code generated in operation 210 is included in a remaining instruction that is not removed in operation 220 to generate and output a compression instruction. The bundle code may be included in a corresponding instruction, for example, a reference instruction for generating the bundle code.

Figure 3A:
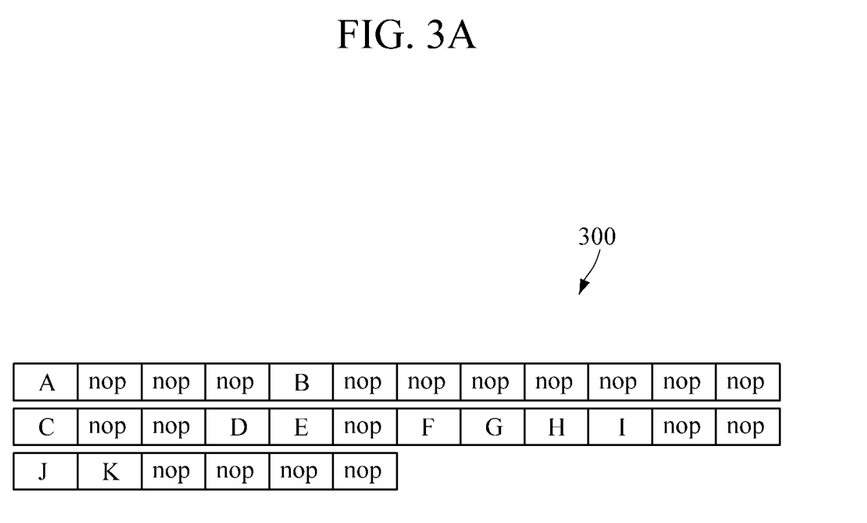
FIG. 3A is a diagram illustrating an example of input instructions.
Figure 3B:
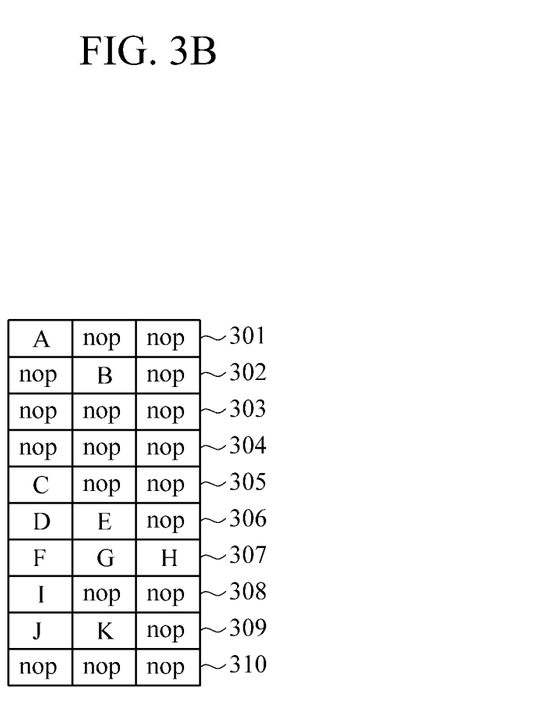
FIG. 3B is a diagram illustrating an example of instruction groups of the input instructions of FIG. 3A.
Figure 3C:
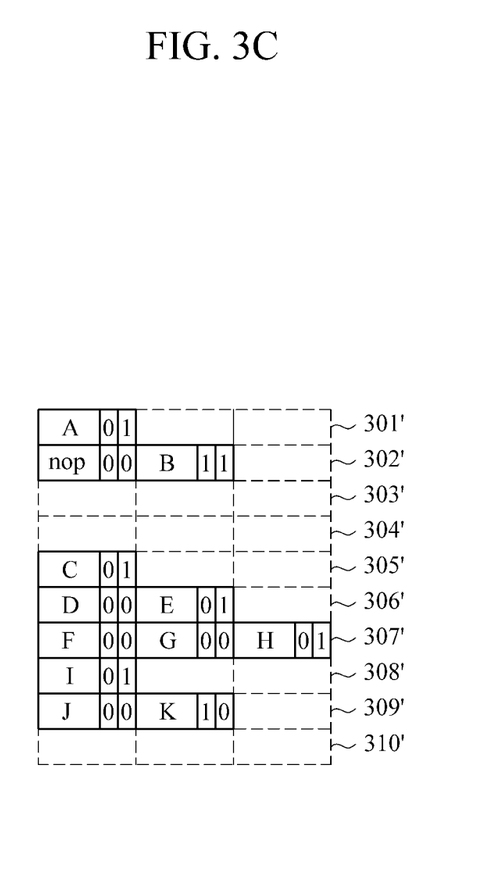
FIG. 3C is a diagram illustrating an example of a compressed instruction.

FIGS. 3A to 3C illustrate examples of how to compress input instructions in an instruction compressing apparatus. In the examples illustrated in FIGS. 3A to 3C, the bundle codes shown in Table 1 are used, but it should be understood that other bundle codes may be used.

FIG. 3A illustrates an example of input instructions 300 that are input to an instruction compressing apparatus.

Referring to the example shown in FIG. 3A, there are thirty input instructions which are is sequentially displayed on a block-by-block basis. In the example illustrated in FIG. 3B, letters "A" to "K" denote valid instructions. The operations indicated by the respective instructions are not limited. Reference characters "nop" denote a no-operation instruction. Referring to FIG. 3A, among the thirty input instructions 300, eleven instructions are valid instructions and the rest of input instructions 300 are NOP instructions. This ratio is merely for purposes of example and the ratio between the valid instruction and the NOP instruction may be varied. In some embodiments, instructions for control rather than data operation may have basic blocks that are of a smaller size and simple data flow, and may be efficiently executed in a very long instruction word (VLIW) computer, but such instructions for control include comparatively more NOP instructions.

FIG. 3B illustrates an example of instruction groups 301 to 310 with input instructions arranged without compression such that three functional units (FUs) execute the input instructions sequentially. The three instructions in each row may be simultaneously allocated to the three respective FUs. Accordingly, the instructions may be sequentially input from the top row 301 to the bottom row 310 and the instructions are executed in that order. FIG. 3C illustrates an example of instruction groups 301' to 310' into which compressed instructions are arranged. Hereinafter, procedures for compressing instructions are described with reference to FIGS. 1 and 3A to 3C.

When the input instructions 300, as illustrated in FIG. 3A, are input to the instruction compressing apparatus 100, the instruction compressing apparatus 100 generates bundle codes for each instruction group as illustrated in FIG. 3B and removes NOP instructions from each instruction group as shown in FIG. 3C. In a first instruction group 301, only the first instruction A is a valid instruction and the rest are NOP instructions. The next instruction group 302 is not a NOP bundle. In this example, the bundle code generating unit 110 generates a bundle code "01" for the first instruction A because all of the following instructions are NOP instructions. In addition, the instruction compressing unit 120 removes all NOP instructions subsequent to the valid instruction A in the first instruction group 301. As the result, the instruction converting unit 130 adds the bundle code "01" to the end of the first instruction A and outputs an instruction as shown in the first row 301' of the example illustrated in FIG. 3C.

In a second instruction group 302, only instruction B is a valid instruction and the rest are NOP instructions. Two instruction groups 303 and 304 following the second instruction group 302 are NOP bundles. In this example, the bundle code generating unit 110 generates a bundle code "00" for the first NOP instruction, and generates a bundle code "11" for the second instruction B which is a valid instruction. Accordingly, based on the bundle code "11" the instruction compressing unit 120 removes a NOP instruction subsequent to the second instruction B in the second instruction group 302 and removes the NOP instructions included in the two subsequent instruction groups 303 and 304. As a result, the instruction converting unit 130 adds the generated bundle codes "00" and "11" respectively to the end of the first NOP instruction and to the end of the second instruction B to output an instruction as shown in the second row 302' to the fourth row 304' as illustrated in FIG. 3C.

In the fifth instruction group 305, only the first instruction C is a valid instruction and the rest are NOP instructions. In addition, the subsequent instruction group 306 is not a NOP bundle. In this example, the bundle code generating unit 110 generates a bundle code "01" for the first instruction C because all instructions subsequent to the first instruction C are NOP instructions. The instruction compressing unit 120 removes all following NOP instructions from the fifth instruction group 305. Consequently, the instruction converting unit 130 adds the generated bundle code "01" to the end of the first instruction C to output an instruction as shown in the fifth row 305' as illustrated in FIG. 3C.

In the sixth instruction group 306, the first instruction D and the second instruction E are valid instructions and the rest is a NOP instruction. The next instruction group 307 is not a NOP bundle. In this example, the bundle code generating unit 110 generates a bundle code "00" for the first instruction D because the instruction E following the first instruction D is a valid instruction. Also, the bundle code generating unit 110 generates a bundle code "01" for the second instruction E. Accordingly, the instruction compressing unit 120 removes the following NOP instruction from the sixth instruction group 306. As a result, the instruction converting unit 130 includes the generated bundle codes "00" and "01", respectively, at the end of the first instruction D and the end of the second instruction E to output an instruction as shown in the sixth row 306' as illustrated in FIG. 3C.

In the seventh instruction group 307, all three instructions F, G, and H are valid instructions. The next instruction group 308 is not a NOP bundle. Thus, the code generating unit 110 generates bundle codes "00" for the first and second instructions F and G, and a bundle code "01" for the last instruction H. In addition, because no NOP instruction exists in the seventh instruction group 307, the instruction compressing unit 130 does not perform any operation. Then, the instruction converting unit 130 adds the generated bundle codes "00", "00", and "01" to the ends of the three instructions F, G, and H, respectively, to output an instruction as shown in the seventh row 307' as illustrated in FIG. 3C.

In the eighth instruction group 308, the instructions are the same as the fifth instruction group 305, and thus the description for this instruction group 308 is not reiterated. In the ninth instruction group 309, the first instruction J and the second instruction K are valid instructions and the rest is a NOP instruction. The next instruction group 310 is a NOP bundle. In this example, the bundle code generating unit 110 generates a bundle code "00" for the first valid instruction J, and a bundle code "10" for the second valid instruction K. In addition, the instruction compressing unit 120 removes the NOP instruction subsequent to the second valid instruction K from the ninth instruction group 309 and all the NOP instructions from the tenth instruction group 310 that follows the ninth instruction group 309. Accordingly, the instruction converting unit 130 includes the bundle codes "00" and "10", respectively, at the ends of the first instruction J and the second instruction K to output an instruction as shown in the ninth and tenth rows 309' and 310' as illustrated in FIG. 3C.

For example, using the instruction compressing apparatus 100 of the example illustrated in FIG. 1 or the instruction compressing method of the example illustrated in FIG. 2, the thirty instructions may be compressed into thirteen instructions as shown in the example illustrated in FIG. 3C. The compression rate may be varied, for example, according to the size of a basic block of the VLIW computer, the combination of valid instructions and NOP instructions, the length of a bundle code, and the like. As shown in the examples above, the bundle code allows instruction compression by removing NOP instructions from one or more instructions bundles. Accordingly, the instruction compression apparatus 100 is efficient for use in a process in which NOP bundles are generated.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of compressing instructions to be executed by a parallel processing computer, the method comprising:
receiving instructions, by the parallel processing computer;
generating, by the parallel processing computer, a bundle code to indicate whether an instruction group following a current instruction group is a no-operation (NOP) instruction group, and whether the current instruction group is terminated,
wherein the bundle code is represented by two bits only, and
wherein the bundle code indicates:
a first code to indicate that the current instruction group is not terminated, a second code to indicate that the current instruction group is terminated and the next instruction group following the current instruction group is not a NOP instruction group,
a third code to indicate that the current instruction group is terminated and the next instruction group following the current instruction group is a NOP instruction group, and
a fourth code to indicate that the current instruction group is terminated and next two instruction groups following the current instruction group are NOP instruction groups;
removing a NOP instruction group from the received instructions based on the generated bundle code, by the parallel processing computer; and
including the generated bundle code in a remaining instruction which has not been removed, by the parallel processing computer.

\* \* \* \* \*